United States Patent [19]

Hammar

[11] 4,192,613
[45] Mar. 11, 1980

[54] CONTOUR DETECTING AND DIMENSION MEASURING APPARATUS

[76] Inventor: Martin Hammar, Erik Sandbergs Gata 21, S-171 34 Solna, Sweden

[21] Appl. No.: 936,644

[22] Filed: Aug. 24, 1978

Related U.S. Application Data

[63] Continuation of Ser. No. 750,552, Dec. 14, 1976, abandoned.

[30] Foreign Application Priority Data

Jan. 8, 1976 [SE] Sweden .................................. 7600141

[51] Int. Cl.$^2$ ........................................... G01B 11/10
[52] U.S. Cl. ..................................... 356/386; 356/376
[58] Field of Search ................ 250/560, 571; 356/376, 356/379, 380, 384, 385, 386

[56] References Cited

U.S. PATENT DOCUMENTS

| | | | |
|---|---|---|---|
| 2,220,736 | 11/1940 | Stockbarger et al. | 250/571 |
| 3,255,357 | 6/1966 | Kapant et al. | 250/227 |
| 3,513,321 | 5/1970 | Sherman | 356/386 |
| 3,555,288 | 1/1971 | Morenius | 250/571 |
| 3,621,266 | 11/1971 | Akuta et al. | 250/560 |
| 3,724,958 | 4/1973 | Callen | 356/384 |
| 3,730,632 | 5/1973 | Chikama | 356/3 |
| 3,806,253 | 4/1974 | Denton | 356/376 |
| 3,941,485 | 3/1976 | Madden | 356/385 |

*Primary Examiner*—John K. Corbin
*Assistant Examiner*—R. A. Rosenberger
*Attorney, Agent, or Firm*—Fleit & Jacobson

[57] ABSTRACT

Apparatus for detecting contours and measuring dimensions of an object employs a plurality of light transmitting means for transmitting a scan of an equal plurality of light rays, and also employs an equal plurality of light receiving means, each arranged to receive light from only a complementary one of the light transmitting means. The object is moved through the light rays such that the object prevents the light receiving means from receiving light shining on one side of the contours of the object. Counter means are employed for counting the number of light receiving means which receive light from corresponding light transmitting means. The light transmitting means and light receiving means are disposed in a configuration enabling a more sensitive detection of the contours yet avoiding the risk of "crosstalk" between adjacent light receivers.

7 Claims, 7 Drawing Figures

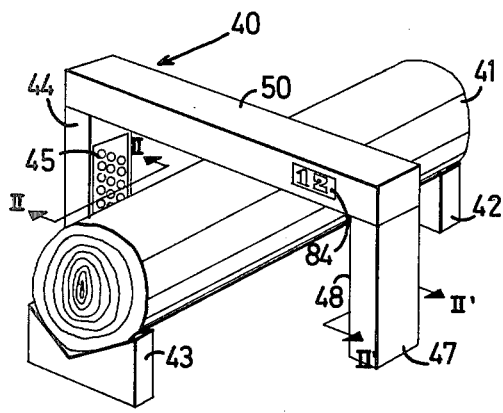
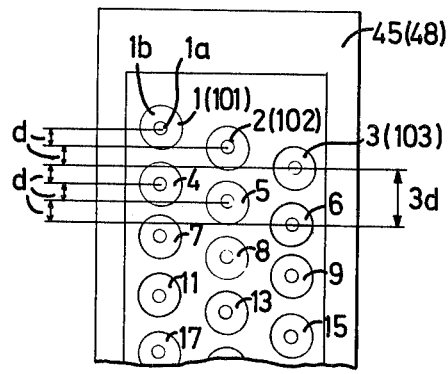
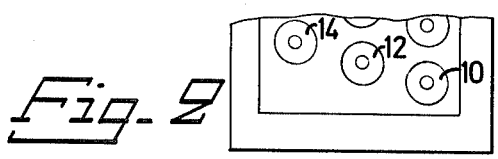
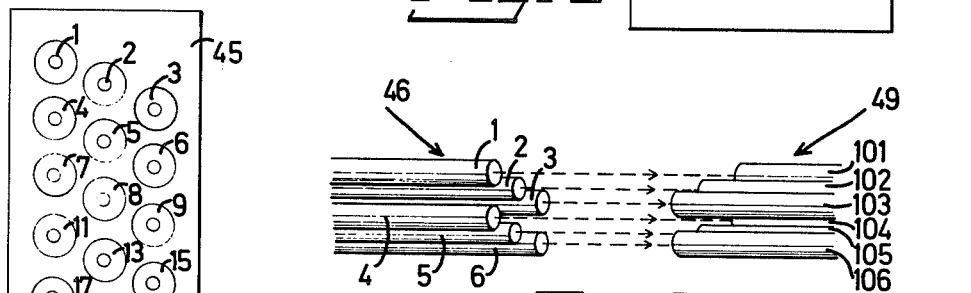
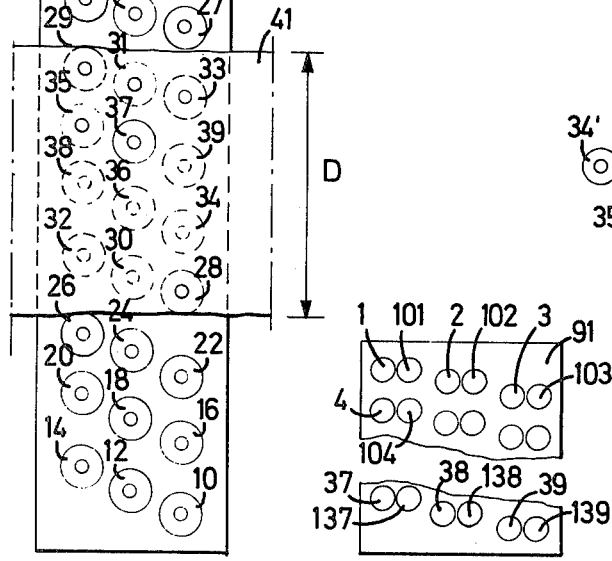
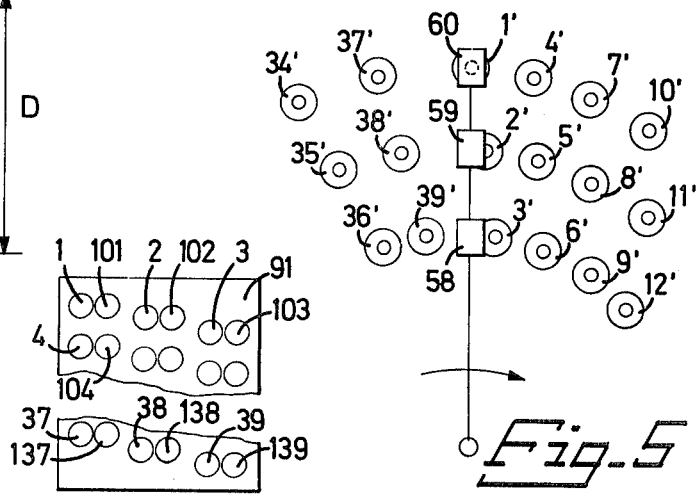

CONTOUR DETECTING AND DIMENSION MEASURING APPARATUS

This is a continuation of application Ser. No. 750,552, filed Dec. 14, 1976, now abandoned.

FIELD OF THE INVENTION

The present invention relates to an apparatus for detecting the contours and measuring the dimensions of an object. The invention is of general utility where it is necessary to measure linear dimensions of an object or to detect the presence and location of a contour or irregularities of an object or to detect the contours of graphical information or the like on an object.

PRIOR ART

There have been devices in the past that have been able to measure linear dimensions by using optical scanner columns (U.S. Pat. No. 3,724,958). However, such devices have not been reliable in situations where extreme measuring accuracy is required. The degree of measuring accuracy has been limited because of the dimensions of the photocells being used, and also because of "cross-talk" between adjacent photocells. Certain prior measuring devices have also been proposed (U.S. Pat. No. 3,255,357) to improve the optical resolution of such measuring devices by using light transmitting optical fibers as light transmitting and light receiving means. However, also the resolution of such prior devices has been limited by the unavoidable distance between two successive fiber cores.

SUMMARY OF THE INVENTION

It is an object of this invention to provide an apparatus which is capable of detecting the contours of an object by photosensing the object by means of light transmitting and light receiving means with a degree of resolution corresponding to or even falling below the dimension of the light transmitting and light receiving means and yet without the risk of "cross-talk".

According to the present invention an apparatus for detecting the contours of an object comprises a measuring station to and from which said object is moved, a plurality of light transmitting means at said station for providing a scan of an equal plurality of light rays, an equal plurality of light receiving means at said station, each arranged to sequentially receive light from only a complementary one of said light transmitting means, means for guiding said object through the paths of the light rays such that said light receiving means are prevented by said object from receiving light from those of the light rays that shine on one side of each of said contours, and counter means for counting the number of said light receiving means which receive light from said complementary light transmitting means. Said light transmitting means are disposed in a predetermined configuration having a first and a second row of light transmitting means, the distance between the centers of two consecutive light transmitting means in each of the rows having a predetermined like value, the rows being arranged in parallel and staggered such that the center of each said light transmitting means in one of the rows is located at a predetermined distance from a point in the row lying opposite to the center of a said light transmitting means in the other row, said predetermined distance being less than said predetermined value. Said light receiving means are disposed in a configuration corresponding to said predetermined configuration.

BRIEF DESCRIPTION OF THE DRAWING

The present invention will now be described in greater detail, by way of example, with reference to the accompanying drawing, in which:

FIG. 1 is a perspective view schematically showing a measuring station for measuring the diameter of logs moving past the station.

FIG. 2 is a front view of a scanning frame of the measuring station as shown in FIG. 1, seen along the arrows II—II of FIG. 1.

FIG. 4 is a perspective view of the mutual positions of some of the complementary light transmitting means and light receiving means as shown in FIG. 3.

FIG. 5 is a schematic front view illustrating how the light transmitting means as shown in FIG. 2 are successively activated.

FIG. 6 is a schematic front view illustrating one configuration of the light transmitting means of the scanning frame as shown in FIG. 2.

FIG. 7 is a schematic front view illustrating an alternative configuration of the light transmitting means and light receiving means of the scanning device according to the present invention.

DESCRIPTION OF THE PREFERRED EMBODIMENT

Figure 3:
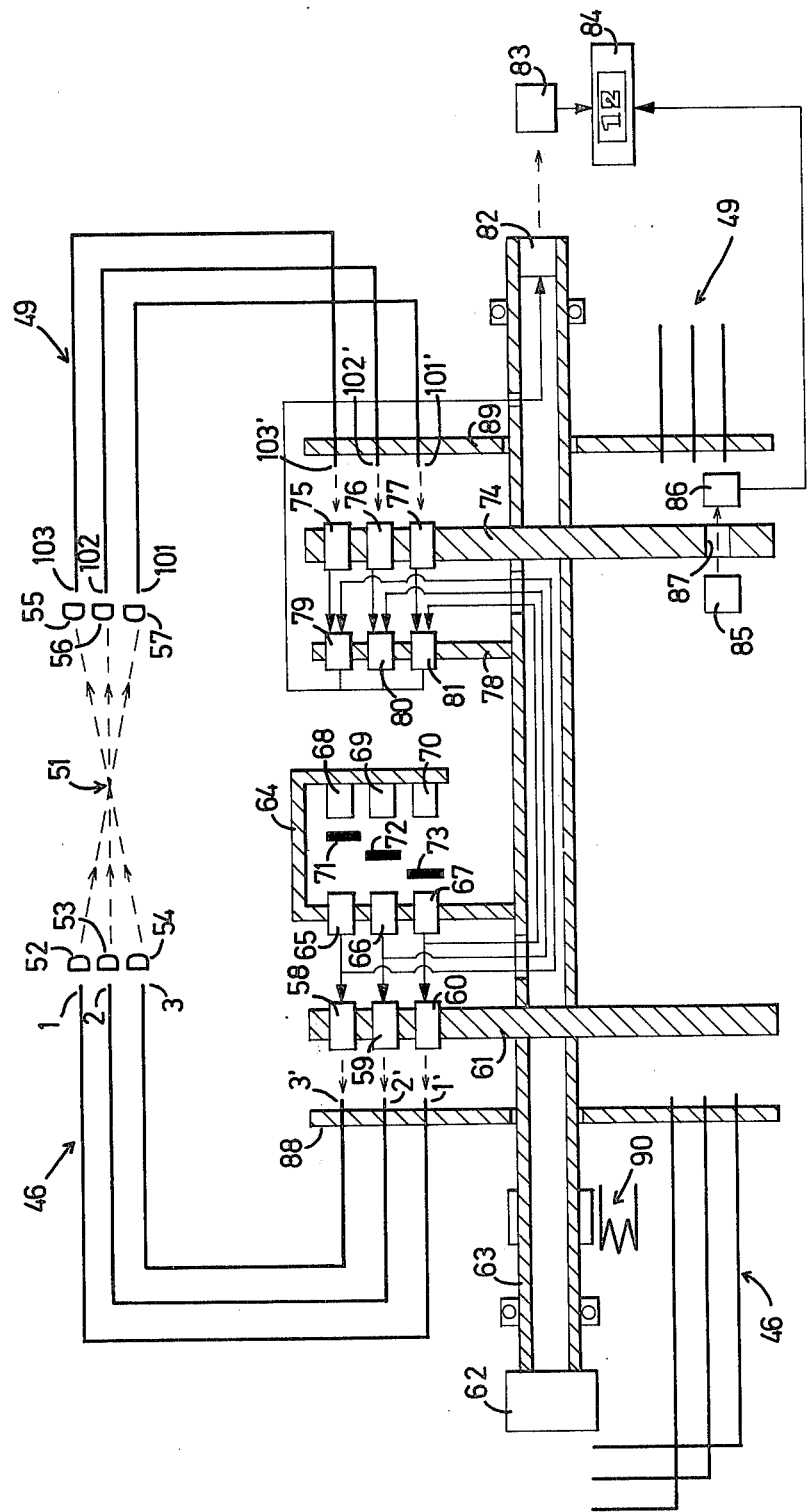
FIG. 3 is a cross-sectional view of the scanning equipment incorporated in the measuring station as shown in FIG. 1, also illustrating the electrical and optical circuits thereof.

Referring now to FIG. 1, a log 41, the diameter of which is to be measured, is carried on a bullchain or the like (not shown) through a measuring station 40. Log 41 is guided axially by means of stationary guiding elements 42 and 43. The bullchain and guiding elements 42 and 43 may be of any suitable conventional type. Measuring station 40 includes at one side a vertical closure 44 housing a light scanning matrix consisting of a plurality of light transmitting stationary fibers 46, as shown in FIG. 3, the output ends of which are disposed in one and the same plane in a vertical measuring or scanning frame 45. Only 39 output ends 1–39 have been shown in the drawing (see FIG. 6) for the purpose of simplicity of illustration. It is to be understood that a log diameter measuring device of this kind should incorporate several hundreds of fibers.

Each fiber consists of a core 1a (see FIG. 2) made of glass or other transparent material having a relatively high index of refraction, which is surrounded with a coating 1b having a low refractive index. The mutual positions of output ends 1–39 are shown in FIGS. 2 and 6.

The other side of measuring station 40 is provided with a vertical closure 47 housing a light receiving matrix consisting of a plurality of light transmitting stationary fibers 49, as shown in FIG. 3, the input ends 101–139 etc of which are disposed in one and the same plane in a vertical measuring or scanning frame 48. Input ends 101–139 of fibers 49 are disposed in a configuration identical with the configuration of output ends 1–39 of fibers 46.

FIG. 2 illustrates a view along the arrows II'—II' of FIG. 1 and also illustrates a view along the arrows II—II of FIG. 1. See also FIG. 4, schematically showing the light ray paths between the six uppermost output ends 1–6 and the six uppermost input ends 101–106 of measuring frames 45 and 48, respectively. The remaining equipment of measuring station 40, shown in greater detail in FIG. 3, is housed in a horizontal closure 50 attached to vertical closures 44 and 47.

Output ends 1–39, as shown in FIG. 2, are alternately disposed in three vertical rows, each row including 13 output ends. Output ends 1–39 are arranged to successively transmit light in the same order as their reference numerals indicate. The rows are arranged in parallel but displaced in parallel a distance d, which is suitably chosen to 1 mm. Thus, the distance between two consecutive output ends of one row is 3d, i.e. 3 mm. In this manner the distance between two scanning rays from two sequentially energized output ends, for example output ends 5 and 6, is equal to 1 mm. In a horizontal view of the ray paths, see FIG. 3, all light rays from output ends 1–39 (only three of which are shown) pass straight above one another in an area 51 between frames 45 and 48.

Six cylinder lenses 52–57, as shown in FIG. 3, are each disposed in front of an individual one of the vertical rows of fiber ends in frames 45 and 48. Lenses 52–57 transform the light into subtantially parallel light rays. In this way, when providing optical isolation between the light paths, straight light paths can be obtained being rectangular in cross-section with a width approximately equal to the width of the cylinder lens and with a height equal to the effective diameter, i.e. 1 mm, of the light transmitting fiber. In those situations where the sensivity of the device is not so critical, lenses 52–57 may however be omitted.

In FIG. 3 three light emitting semi-conductor diodes (LEDs) 58–60 are mounted on a circular disc 61 which is rigidly attached to a shaft 63 rotated by a motor 62. Rigidly mounted on shaft 63 is also a supporting device 64 supporting three photocells 65–67 and three LEDs 68–70, each arranged to energize a complementary one of photocells 65–67. Each photocell 65–67, when energized, emits an electrical pulse with a duration of 5 $\mu$s. The plurality of fibers 46 cooperate with an equal complementary plurality of shutters, three shutters 71–73 of which are shown in FIG. 3. The shutters are arranged, when rotating shaft 63, to sequentially close and then open the light path between a complementary one of LEDs 68–70 and its complementary one of photocells 65–67 such that each LED 58–60 is consecutively activated during 5 $\mu$s to emit light in a predetermined succession onto a complementary one of input ends 1'–39' of fibers 46.

Shaft 63 also supports rigidly a circular disc 74 having three phototransistors 75–77 mounted thereon. Phototransistors 75–77 are each arranged, when rotating shaft 63, to be consecutively impinged by light from a complementary one of output ends 101'–139' of fibers 49. Shaft 63 has also rigidly mounted thereon a supporting device 78 supporting three amplifiers 79–81, each being provided with two input terminals and one output terminal. Each one of amplifiers 78–81 are arranged to generate an amplified output signal at its output terminal if one of its input terminals receives a signal from a corresponding one of phototransistors 75–77 and if the other input terminal simultaneously receives a 5 $\mu$s signal from a corresponding one of photocells 65–67. Output signals (pulses) appearing at the output terminal of amplifiers 79–81 are supplied to a LED 82 being positioned in one end of shaft 63. Upon receiving a pulse LED 82 will generate a light pulse which is detected by a stationary photocell 83. Photocell 83 produces a measuring pulse each time it detects such a light pulse. The measuring pulses from photocell 83 are delivered to a counter 84 which counts the number of measuring pulses received during one revolution of shaft 63. Counter 84 subtracts the number of counted measuring pulses from the total number (39) of fibers such that the difference defines the thickness of log 41.

A stationary photodiode 85 is arranged to project light onto a photocell 86 each time the light path therebetween is opened by an aperture 87 formed in disc 74. Each projection of light on photocell 86 produces an electric pulse which is applied to counter 84 in order to reset it to zero.

Stationary fibers 46, output ends 1–39 of which are shown in FIGS. 2 and 6, have their opposite ends 1'–39' (only three of which are shown in FIG. 3) attached to a stationary circular disc 88. Input ends 101–139 of stationary fibers 49 are arranged in frame 48 in a manner described above. Opposite ends 101'–139' (only three of which are shown in FIG. 3) are mounted on a stationary circular disc 89.

The principle of the light scanning will become apparent from FIGS. 3, 5 and 6. Shutters 71–73, LEDs 58–60 and fiber ends 1'–3' are so mutually arranged that only one of LEDs 58–60 is located in front of a complementary one of fiber ends 1'–3' (see FIG. 5) when a corresponding one of shutters 71–73 opens the light path between a corresponding one of LEDs 68–70 and a corresponding one of photocells 65–67. For instance, when shutter 73 opens the light path between LED 70 and photocell 67 only LED 60 of LEDs 58–60 will be energized. At that instant only LED 60 of LEDs 58–60 will be in front of its corresponding fiber end, i.e. fiber end 1'. Fiber end 1' thereby receives light which is transmitted through corresponding fiber to fiber end 1 (see FIG. 3) which transmits a light ray through measuring station 40 to fiber end 101 in case log 41 does not block the light ray. Light is then transmitted from fiber end 101 via corresponding fiber to fiber end 101'. Phototransistor 77 is arranged to be in front of fiber end 101' at this instant and to emit an electric signal to amplifier 81. Simultaneously, amplifier 81 receives a 5 $\mu$s signal from photocell 67, thereby causing amplifier 81 to generate an output signal to LED 82.

In the meantime, shaft 63 rotates an angle (see FIG. 5) so that LED 59 will be in front of fiber end 2'. Shutter 72 is so located that it now opens ligh path between LED 69 and photocell 66 causing LED 59 to project light onto fiber end 2' such that fiber end 102' will transmit light (if log 41 does not block the light ray) to phototransistor 76 causing LED 82 to receive a further pulse.

Continued rotation of shaft 63 causes LED 58 to shine light on fiber end 3'. Thereafter, LED 60 will shine light on fiber end 4', etc.

Fiber ends 1–9, see FIG. 6, are arranged in frame 45 in sequential order from the upper end towards the lower end of frame 45. All fiber ends 11, 13, . . . 39 having odd number are arranged in sequential order after ends 1–9. All fiber ends 10, 12, . . . 38 having even number are arranged in sequential order from the lower end towards the upper end of frame 45.

By thus arranging fiber ends 1–39 as shown in FIG. 6 there there will firstly be generated a downwardly travelling scan (from fiber ends 1–9) and then two scans (from fiber ends 10, 12, . . . 38 and 11, 13, . . . 39, respectively) which two scans alternately are travelling downwards and upwards, respectively, toward each other. Log 41 is blocking, see FIG. 6, the upwards travelling scan from fiber end 28 and the downwards travelling scan from fiber end 29. Thus, log 41 blocks the light path from twelve fiber ends 28–39, the number of which is indicated by counter 84. The mutual positions of fiber ends 1–39 are chosen such that for logs having a frequent dimension the two opposed scans reach a contour of the log substantially simultaneously. By thus using two opposed scans the influence of any vertical movement of log 41 during its passage through measuring station 40 will be reduced.

According to another embodiment of the invention, not shown in the drawing, LEDs 58–60 and phototransistors 75–77 are supplemented by a second matrix of LEDs and phototransistors together with trigger circuits and amplifiers analogous to those shown in FIG. 3. The ends of fibers 46 and 49 are then so mutually disposed that two syncronous toward each other travelling scans are generated. In this way, the scan rate will be doubled. However, since the configuration of such embodiment is built analogously to what is shown in FIG. 3, it is not deemed necessary to describe or show it in more detail.

Measuring station 40 of the embodiment illustrated in the drawing includes only two opposed measuring frames 45 and 48. In those situations where it is desirable to sense contours of an object along several measuring directions the measuring station is provided with several pairs of opposed measuring frames, the pairs of frames being angularly spaced with respect to one another.

The necessary circuits for delivering power to the active components of the embodiment illustrated have not been shown in the drawing, merely for the purpose of simplicity of illustration. It would be appreciated that the power delivery could be made inductively, for eaxample, as is schematically shown by reference numeral 90 in FIG. 3.

In an alternative configuration of fiber ends 1–39 and 101–139 both fiber ends 1–39 and fiber ends 101–139 are disposed in a common measuring frame 91 as is shown schematically in FIG. 7. This alternative is suitable in those situations where the moving object has a plane light reflecting surface, the contours of which are to be detected. Fiber ends 101–139 then receive light from corresponding light transmitting fiber ends 1–39 only if the object reflects the transmitted light rays. Thus, the number of light receiving fiber ends represents the width of the plane surface of the object.

Whilst the embodiments of the present invention as herein disclosed are intended for measuring the width or thickness of an object, it is to be understood that the invention can be utilized for detecting the location of an edge, contours, information drawn on a paper or the like, or for detecting discontinuances of a contour of an object. For example, the invention is advantageously utilized when detecting the degree of curvature of an object.

Therefore, it is to be understood that further modifications can be made without departing from the true spirit and scope of the invention as defined in the appended claims.

I claim:

1. Apparatus for detecting the contours of an object, comprising:
   (a) a measuring station to and from which said object is moved;
   (b) a plurality of light transmitting means at said station for providing a scan of an equal plurality of light rays;
   (c) an equal plurality of light receiving means at said station each arranged to sequentially receive light from only a complementary one of said light transmitting means;
   (d) each of said light transmitting and light receiving means having a predetermined physical dimension in a predetermined direction, said physical dimension restricting the minimum closeness between two light transmitting and light receiving means, respectively, to an edge-to-edge relationship;
   (e) means for guiding said object through the paths of the light rays such that said light receiving means are prevented by said object from receiving light from those of the light rays that shine on one side of each of said contours;
   (f) counter means for counting the number of said light receiving means which receive light from said complementary light transmitting means;
   (g) said light transmitting means disposed in a predetermined configuration having a first and a second row of light transmitting means, the distance between the centers of two consecutive light transmitting means in each of the rows having a predetermined like value, the rows being arranged in parallel and staggered such that the center of each said light transmitting means in one of the rows is located at a predetermined distance from a point in said one row which point lies opposite to the center of a said light transmitting means in the other row, said predetermined distance being less than said predetermined value and less than said physical dimension;
   (h) said light receiving means being disposed in a configuration corresponding to said predetermined configuration; and
   (i) movable light source means being provided to sequentially activate a predetermined number of said light transmitting means alternately in each of said rows such that each of said rows emits a scan of light travelling in said predetermined direction, the scans of the different rows forming a composite scan wherein the distance between two consecutive light rays, as seen along said predetermined direction, is equal to said predetermined distance.

2. Apparatus according to claim 1, wherein said movable light source means are provided to sequentially activate said predetermined number of said light transmitting means such that each row emits two scans of light which are progressively travelling toward each other.

3. Apparatus according to claim 1, wherein each row of light transmitting means consists of the output ends of a predetermined number of stationary light transmitting optical fibers and each row of light receiving means consists of the input ends of a corresponding number of stationary light transmitting optical sound fibers, one of said movable light sources being provided for each row to sequentially project light on the input ends of the first fibers, and a movable light responsive means for each row being provided to sequentially sense each output end of the second fibers.

4. Apparatus according to claim 3, wherein the input ends of the first fibers are arranged to sequentially and in succession receive light from said light sources, a selected number of the output ends of the first fibers being arranged in the rows such that every second output ends of the selected number of output ends are provided to produce a first scan of light travelling in a first direction, the other output ends of the selected number of output ends being arranged in the rows to produce a second scan of light travelling in a direction opposite to the first direction.

5. Apparatus according to claim 4, wherein the light sources are arranged to sequentially move past the input ends of the first fibers in its corresponding row, the light sources being provided to emit light during a predetermined time interval each time it moves past each of said input ends of the first fibers, each light responsive means being arranged to move past the output ends of the second fibers in synchronism with corresponding light source, means being provided to trigger each light responsive means simultaneously with the emission of light from corresponding light source.

6. Apparatus according to claim 5, wherein said light responsive means are capable of producing an electric pulse to said counter means when the light responsive means is simultaneously triggered and receives light, said counter means being provided to count the number of said pulses during one cycle of light transmission to all the first fibers.

7. Apparatus according to claim 1, wherein the light transmitting means are placed in such relationship relative to the light receiving means that all light rays travel substantially above one another in a predetermined area between the light transmitting means and the light receiving means.

* * * * *